United States Patent
Gubb et al.

[11] Patent Number: 5,883,918
[45] Date of Patent: Mar. 16, 1999

[54] OXY:FUEL MELTING FURNACE

[75] Inventors: Leigh Francis Gubb, Herne Bay; Savino Leopoldo Aimi, Kennington, both of United Kingdom

[73] Assignee: Queenboro Rolling Mill Company Ltd., Kent, United Kingdom

[21] Appl. No.: 685,454

[22] Filed: Jul. 19, 1996

[30] Foreign Application Priority Data

Jul. 21, 1995 [GB] United Kingdom ................ 9515080

[51] Int. Cl.⁶ .................................................. H05B 7/00
[52] U.S. Cl. ................................. 373/20; 373/79; 75/25
[58] Field of Search ................................. 373/18, 20, 79, 373/80, 73, 76, 77; 432/3, 24; 75/25, 380

[56] References Cited

U.S. PATENT DOCUMENTS

| | | |
|---|---|---|
| 2,526,658 | 10/1950 | Harman et al. . |
| 4,032,121 | 6/1977 | Stift et al. ................................. 266/163 |
| 4,193,756 | 3/1980 | Leon ................................................ 432/3 |
| 4,575,394 | 3/1986 | Nixon .......................................... 75/59.19 |
| 4,666,402 | 5/1987 | Wilhelmsson ................................. 432/24 |
| 4,730,336 | 3/1988 | Herneisen et al. ............................. 373/2 |
| 4,836,847 | 6/1989 | Bishop et al. ................................. 75/25 |
| 5,513,206 | 4/1996 | Mori et al. ................................... 373/80 |
| 5,540,752 | 7/1996 | Spoel ........................................... 75/380 |
| 5,548,611 | 8/1996 | Cusick et al. ............................... 373/18 |

FOREIGN PATENT DOCUMENTS

| | | |
|---|---|---|
| 2018696 | 10/1971 | Germany . |
| 59-226110 | 12/1984 | Japan . |
| 1362167 | 7/1974 | United Kingdom . |
| 1454242 | 11/1976 | United Kingdom . |
| 1507870 | 4/1978 | United Kingdom . |
| 2283560 | 5/1995 | United Kingdom . |

*Primary Examiner*—Tu B. Hoang
*Attorney, Agent, or Firm*—Iandiorio & Teska

[57] ABSTRACT

An oxy:fuel melting furnace (2) comprising a rotatable furnace body (4), a normally stationary non-rotatable furnace roof (6) for fitting on the furnace body (4), dynamic sealing means (8) for dynamically sealing the furnace roof (6) on the furnace body (4) such that the furnace body (4) can rotate with respect to the furnace roof (6), tiltable support means (10) for supporting the furnace body (4) such that tilting of the support means (10) causes tilting of the furnace body (4) for tapping and slagging, moving means for moving the furnace roof (6) up and down with respect to the furnace body (4), heating means (12) which is mounted on the furnace roof (6) and which is for providing heat for the melting of material such as scrap steel and ore, and a pre-heater means (14) for pre-heating the material prior to its introduction into the furnace body (4), and the oxy:fuel melting furnace being such that at least one of the heating means and the pre-heating means is such that it burns oxy:fuel.

10 Claims, 5 Drawing Sheets

OXY:FUEL MELTING FURNACE

TITLE OF THE INVENTION

1. Field of the Invention

This invention relates to an oxy:fuel melting furnace.

2. Description of Related Art

There are many known types of melting furnaces for melting metal such as scrap steel and directly reduced iron. The majority of these furnaces are heated by electricity. The electricity is simple to use and the melting furnaces work well with small loads. However, the electricity needs to be generated and many countries do not have readily available electricity or the. Electricity has to come from a long way away. If the electricity is generated from a primary fuel, then approximately 65% of the primary fuel may be used up in just generating the electricity.

SUMMARY OF THE INVENTION

It is an aim of the present invention to reduce the above mentioned problems.

Accordingly, the present invention provides an oxy:fuel melting furnace comprising a rotatable furnace body, a normally stationary non-rotatable furnace roof for fitting on the furnace body, dynamic sealing means for dynamically sealing the furnace roof on the furnace body such that the furnace body can rotate with respect to the furnace roof, tiltable support means for supporting the furnace body such that tilting of the support means causes tilting of the furnace body for tapping and slagging, moving means for moving the furnace roof such that the furnace roof is able to be lowered onto the furnace body when the furnace body is to be tilted for the tapping and slagging, and such that the furnace roof is able to be raised from the furnace body in order to allow the rotation of the furnace body relative to the furnace roof during melting of material introduced into the furnace body, heating means which is mounted on the furnace roof and which is for providing heat for the melting, and pre-heating means for preheating the material prior to its introduction into the furnace body, and the oxy:fuel melting furnace being such that at least one of the heating means and the preheating means is such that it burns oxy:fuel.

The oxy:fuel burner means uses primary fuels and thus losses due to the generation of electricity for providing the primary source of power for melting are avoided. Still further, the use of the oxy:fuel can be such that it is energy efficient. Also, the use of the oxy:fuel is environmentally friendly since it is able to keep to a minimum the amount of different oxides of nitrogen generated and discharged to the atmosphere.

The melting furnace of the present invention is advantageously used in small steel works where scrap metal is generated. For example, the melting furnace can be used in steel works which generate up to 1,000,000 tones of generated steel per annum. The melting furnace of the present invention is also advantageously used in small rolling mill steel works that want to make their own steel. Still further, the melting furnace of the present invention is suitable for use in third world countries which have suitable feed material at remote sites but which do not have readily available electricity as the primary melting source for the melting furnace.

The melting furnace of the present invention has a rotatable furnace body in order to bring the material to be melted underneath the oxy:fuel burner means which is mounted on the normally stationary furnace roof. The material in the furnace body to be melted is thus able to be evenly heated in order to melt all the material in the furnace body in the shortest possible time. The rotation of the furnace body is also advantageous in that it causes mixing of the molten material in the furnace body. The rotation of the furnace body can be conducted as desired and it can also be stopped when desired. The furnace roof is dynamically sealed to the furnace body in order to seal the generated gases as much as possible in the furnace body. This minimises on the amount of lost fumes and is thus better for the environment.

Preferably, the furnace body is a shallow furnace body. Such a shallow furnace body allows the rapid transfer of heat from the oxy:fuel burner means to the material to be heated, for example scrap steel or iron ore. A deeper furnace body may be used if desired.

The furnace body may rotate on wheels or on any other suitable and appropriate arrangement.

The furnace body will usually be lined with a refractory material. Any suitable and appropriate type of refractory material may be employed. Thus, for example, the refractory material may be refractory bricks. When refractory bricks are used, then fired magnesia bricks may be used on the base part of the furnace body, carbon bonded tempered magnesia bricks may be placed on top of the magnesia bricks, and carbon bonded tempered magnesia carbon bricks may be used on the sides of the furnace body.

The furnace body may include water cooled means. The water cooled means may be one or more water cooled panels.

The dynamic sealing means may comprise a piston ring acting on an inclined surface. At the start of rotation of the furnace body, the piston ring may operate to find its own centre of rotation.

The dynamic seal may be such that a top ring seals the furnace roof to the furnace body when the furnace roof is lowered onto the furnace body and the furnace body is tilted for the tapping and slagging. In order to help to stop gas loss, the melting furnace may be operated with a slight negative pressure. This may be done by using fans to suck out gases which can then be balanced against entering hot gas pressure, in order to give an overall slight negative pressure balance. The fans may be pressure controlled fans in a pressure controlled loop. If desired, the melting furnace may be operated with a slight positive pressure to avoid the ingress of cold air, rather than trying to retain gases by operating with the slight negative pressure.

The tiltable support means may be a tiltable platform means. The tiltable platform means may comprise a platform mounted on rockers. Alternatively, the tiltable platform means may comprise a platform mounted on pivot points. The pivot points may be trunnions. If desired, the tiltable support means may comprise a tilting frame mounted totally on hydraulic cylinders and screw jacks.

Preferably, the oxy:fuel burner means comprises two sets of three burners. The oxygen required for the oxy:fuel burner means may be generated in an oxygen generating plant. The oxygen generating plant may be an atmospheric compression plant which liquifies the atmosphere and fractions off and separates the required gases. The fuel for the oxy:fuel burner means may be any suitable and appropriate type of fuel such for example as oil, pulverised coal or natural gas.

The moving means for the furnace roof may be four hydraulic cylinders. The vertical displacement required for the horizontal roof may be obtained by dialling in the appropriate displacement required on a control panel.

The pre-heating means preferably comprises a trommel. The trommel is a rotary cylindrical preheater. The trommel will usually be rotated by a motor. The material to be melted will pass along the trommel at a rate dependent upon the speed of rotation of the trommel.

The trommel may be lined with a refractory material for protecting the trommel against the effects of the pre-heating. If desired, the trommel can be water cooled in addition to being lined with the refractory material.

The trommel is preferably pre-heated by exhaust gases from the furnace body. This makes the entire operation of the melting furnace very energy efficient. At the end of the trommel, the material to be melted falls into the furnace body. Any suitable and appropriate type of pre-heating means may be employed so that, for example, the pre-heating means may alternatively be a heated conveyer arrangement.

The melting furnace of the present invention may include adding means for adding chemical additions to the furnace body for increasing the temperature in the furnace body, the adding means being mounted on the furnace roof. The chemical additions may be, for example, carbon and/or oxygen. The chemical additions may be blown onto the molten material, for example molten steel, from a lance.

BRIEF DESCRIPTION OF THE DRAWINGS

An embodiment of the invention will now be described solely by way of example and with reference to the accompanying drawings in which.

DESCRIPTION OF THE PREFERRED EMBODIMENTS

Figure 1:
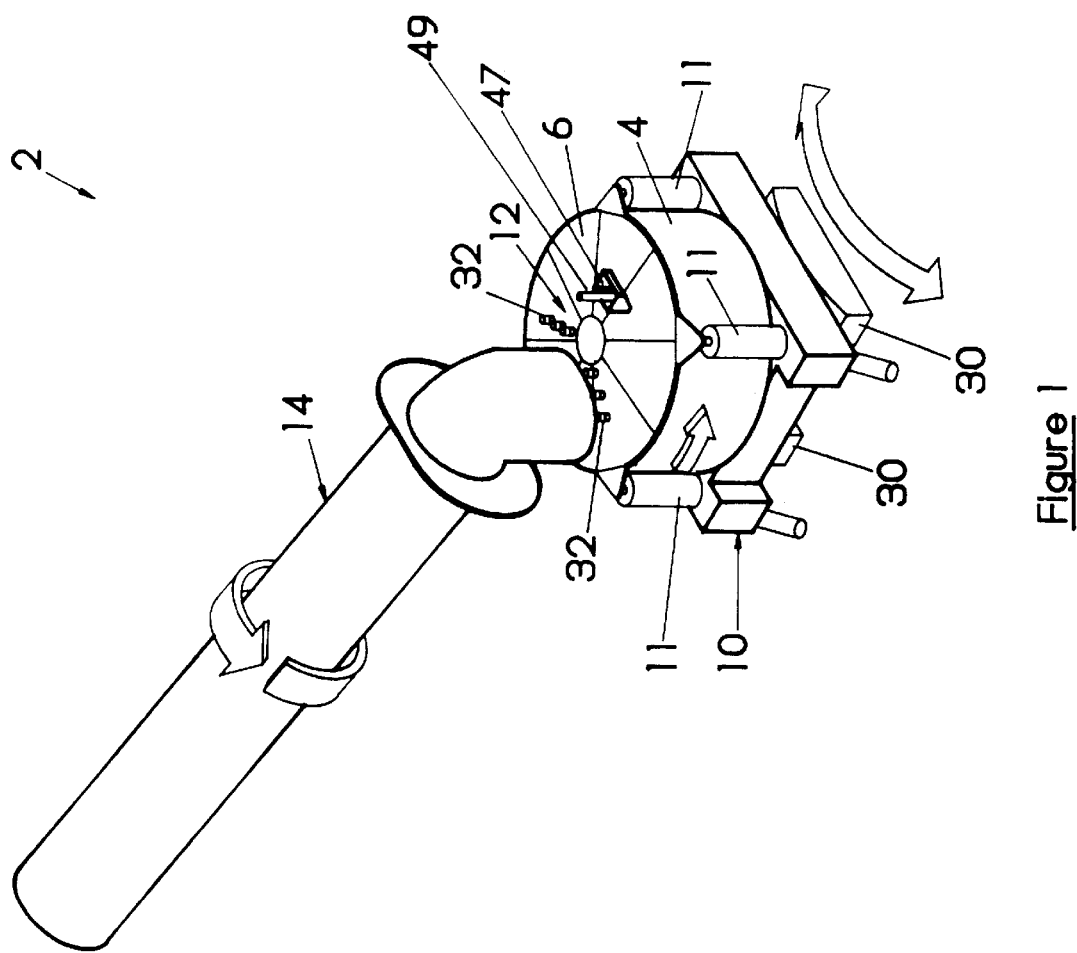
FIG. 1 is a simplified perspective view of an oxy:fuel melting furnace.

Referring to the FIGS. 1–5, there is shown an oxy:fuel melting furnace 2 comprising a rotatable furnace body 4, a normally stationary non-rotatable furnace roof 6 for fitting on the furnace body 4, and dynamic sealing means 8 for dynamically sealing the furnace roof 6 on the furnace body 4 such that the furnace body 4 can rotate on wheels 7 with respect to the furnace roof 6. The melting furnace 2 also comprises tiltable support means in the form of tiltable platform means 10 for supporting the furnace body 4 such that tilting of the platform means 10 causes tilting of the furnace body 4 for tapping and slagging.

Moving means in the form of four hydraulic cylinders 11 are employed for moving the furnace roof 6 such that the furnace roof 6 is able to be lowered onto the furnace body 4 when the furnace body 4 is to be tilted for the tapping and slagging, and such that the furnace roof 6 is able to be raised from the furnace body 4 in order to allow the rotation of the furnace body 4 relative to the furnace roof 6 during melting of material such as scrap steel or directly reduced iron introduced into the furnace body 4.

The material is melted by heating means in the form of oxy:fuel burner means 12 mounted on the furnace roof 6. Pre-heating means 14 is employed to pre-heat the material prior to its introduction into the furnace body 4.

Figure 2:
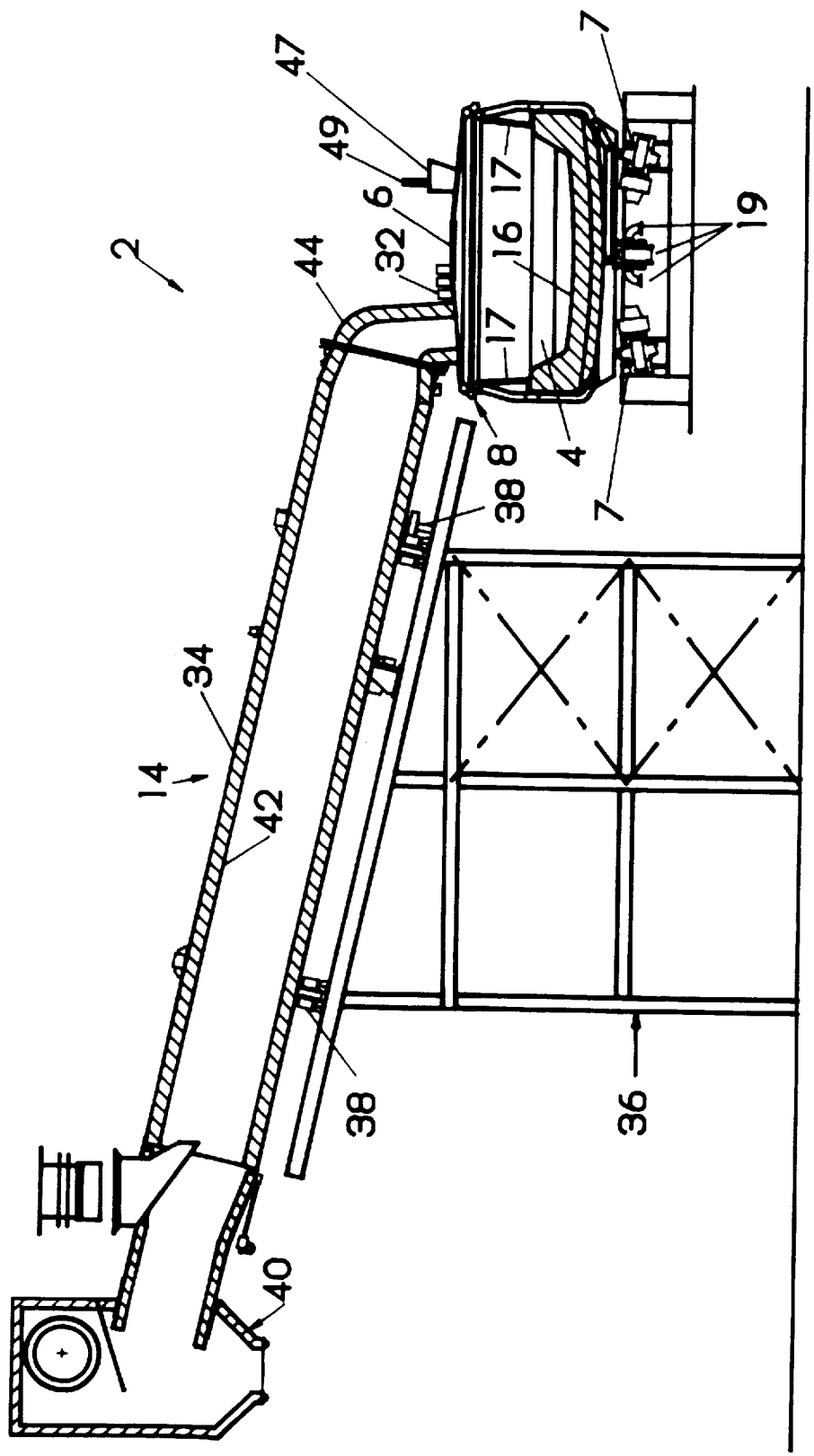
FIG. 2 is a cross section through the melting furnace shown in FIG. 1 and shows more detail.
Figure 3:
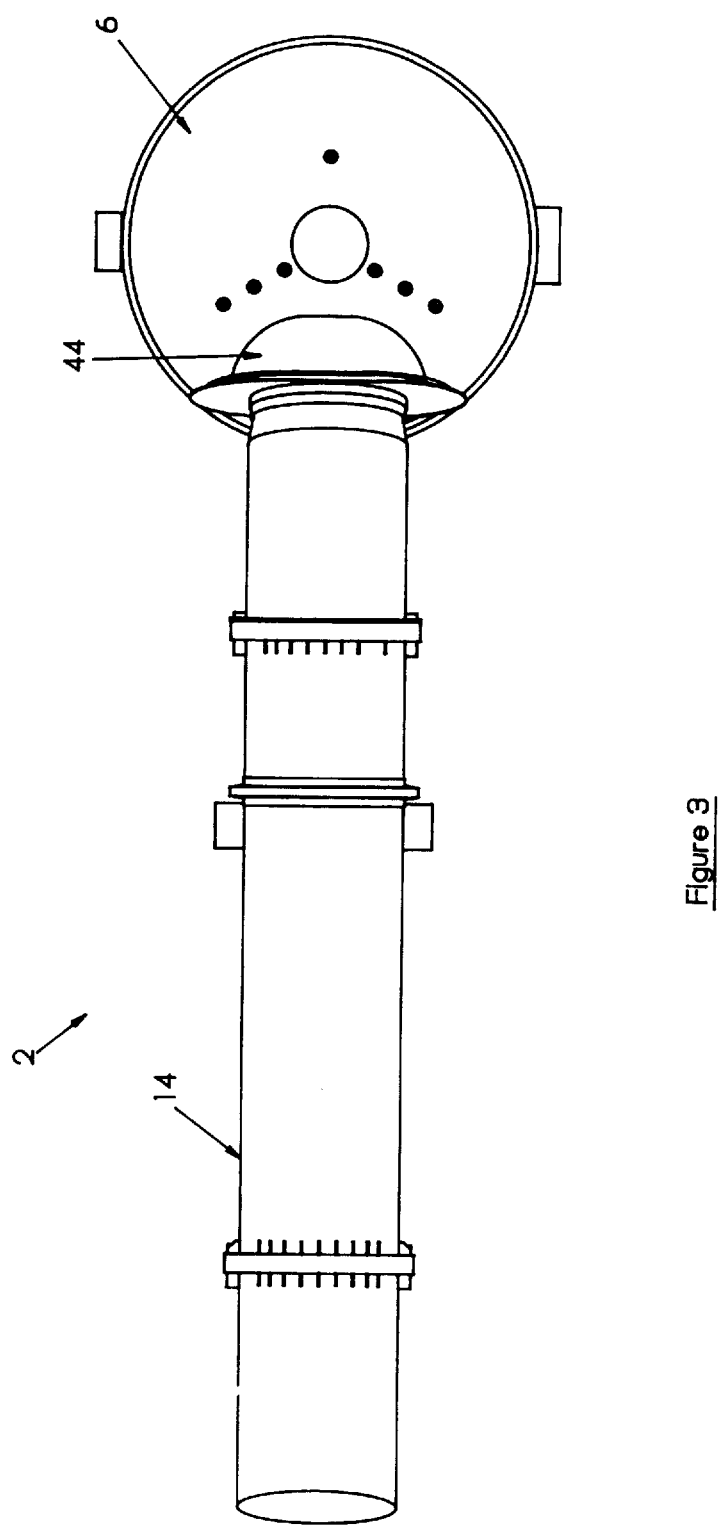
FIG. 3 is the top plan view of part of the melting furnace shown in FIG. 2.
Figure 4:
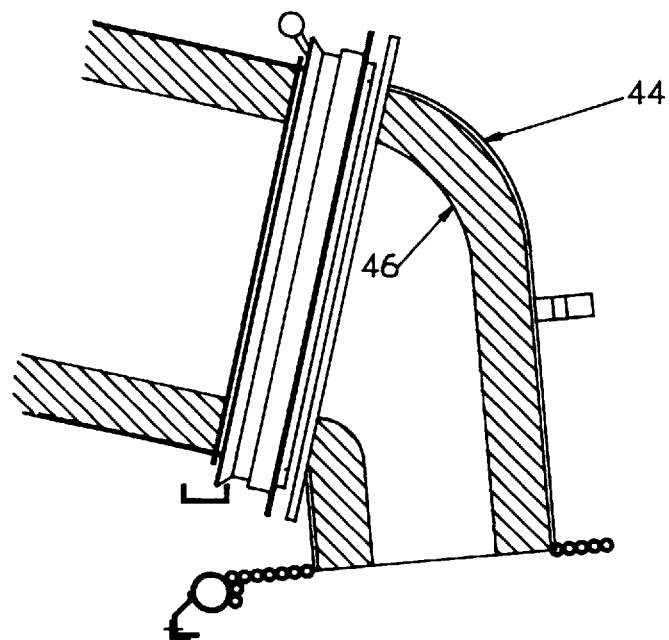
FIG. 4 is an amplified section of a refractory lined fume take-off hood part of the refractory furnace as shown in FIG. 2.

As can best be seen from FIG. 2, the furnace body 4 is a shallow furnace body 4. This allows the transfer of heat rapidly to take place from the burner means 12 to the material to be melted. The material to be melted is melted in a hearth 16 in the furnace body 4. The hearth 16 is lined with refractory material in the form of refractory bricks. In order further to protect the furnace body 4 from the effects of heat, the furnace body 4 is provided with water cooled means in the form of water cooled panels 17. Water-cooling supply and return connections 19 are provided for the supply and return of water to the panels 17.

Figure 5:
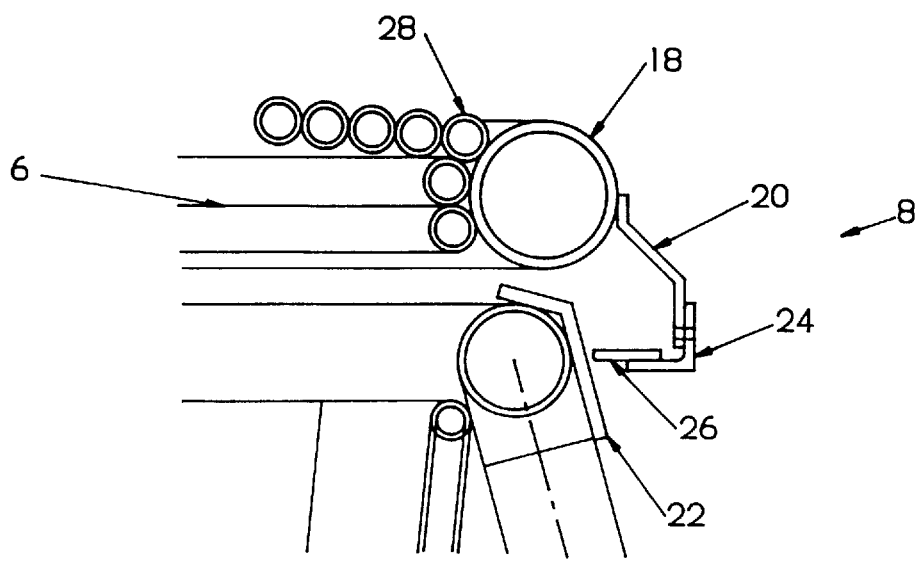
FIG. 5 is an enlarged sectional view of part of the melting furnace shown in FIGS. 1 and 2 and illustrates how the furnace roof seals to the furnace body.

As can best be seen from FIGS. 2 and 5, the dynamic sealing means 8 comprises a piston ring arrangement acting on an inclined surface. More specifically, the dynamic sealing means 8 comprises a roof ring 18, a cranked support ring 20 and a tapered ring 22. A rolled steel angle member 24 is mounted on the cranked support ring 20. This rolled steel angle member 24 supports a roof seal in the form of a loose piston ring 26. As can be seen from FIG. 5, the furnace roof 6 is provided with water cooled roof pipes 28. The roof seal loose piston ring 26 engages the tapered ring 22 as the furnace roof 6 is lowered onto the furnace body 4.

As shown schematically in FIG. 1, the platform means 10 is mounted on rockers 30 for effecting the tilting of the platform means 10.

FIG. 1 shows how the burner means 12 comprises two sets of three burners 32. These burners 32 extend through the furnace roof 6.

The pre-heating means 14 comprises a trommel 34 which is mounted at an angle on a supporting framework 36 as can best be seen from FIG. 2. The trommel 34 rotates on support wheels 38 and it is rotated by an appropriate motor. As shown in FIG. 2, material to be melted is fed into the trommel 34 from a vibratory feeder 40. Alternatively, if desired, a belt conveyor can be used instead of the vibratory feeder 40. The trommel 34 is connected to the furnace roof 6 as shown in order that the material to be melted can be allowed to fall into the furnace body 4, at a rate dependent upon the rotation of the trommel 34. In addition, the connection of the trommel 34 to the furnace roof 6 enables hot gases from inside the furnace body 4 to raise and pass through the trommel 34, thus pre-heating the material in the trommel 34. The trommel 34 is protected from the effects of the heat by being lined with a refractory material 42. The connection of the trommel 34 to the furnace roof 6 is effected by a fume take-off elbow 44 which is lined with a refractory material 46 and which is shown most clearly in FIG. 4.

When the melting furnace 2 is started up, cold material to be melted is fed into the trommel 34 via the vibratory feeder 40. The hearth 16 of the furnace body 4 is filled with the cold material to be melted. When the hearth 16 is covered by the material, the hearth 16 is protected by the material and so the burner means 12 can then be turned on. Once the burner means 12 are operating and the material has been melted, then hot gases will build up in the furnace body 4 and these can then be used to pre-heat the material in the trommel 34, the hot gases passing through the fume take-off elbow 44 and into the trommel 34. This increases the operating efficiency of the melting furnace 2.

A level sensor (not shown) is employed in the furnace roof 6 in order to detect the level of the material to be melted in the furnace body 4. The level sensor is able to detect how much space is left in the furnace body 4 and it can then control the amount of material to be melted coming in from the trammel 34. The level sensor is advantageously a radar sensor which works in a closed loop system with a temperature sensor. The temperature sensor may be employed to control the feeding of the material to be melted into the furnace body 4, until the furnace body 4 is at a pre-determined temperature. The higher the temperature, the more thermally efficient will be the melting process.

When the furnace body 4 is full, the trommel 34 is stopped from rotating and thus feeding further material into the furnace body 4. At this point, air may be used to chill the exhaust gases passing through the fume take-off elbow 44 in order to prevent overheating of the material in the trommel 34.

The trommel 34 is mounted on load cells (not shown). The load cells enable the weight of the trommel 34 to be measured, in order to give an indication of the amount of material contained in the trommel 34.

If a temperature sensor (not shown) detects that the temperature in the furnace body 4 is not hot enough, then chemical additions such for example as carbon and/or oxygen can be injected into the furnace body 4. The chemical additions are added through adding means in the form of a small hopper 47 which is mounted on the furnace roof 6. A lance 49 is used for adding oxygen for refining purposes.

Usually, the composition of the molten material in the hearth 16 will be regularly measured.

The melting furnace 2 is advantageously used as a primary melting facility in order to melt appropriate material such as metal scrap and directly reduced iron and to provide it in a semi-finished condition when it is tapped from the melting furnace 2. The melting furnace 2 is thus able to produce a semi-finished steel which can then be refined in a separate steel making station such for example as in a ladle furnace. The final refining of the steel in the second steel making station is preferred since the second steel making station can concentrate on minor adjustments needed to give steel of the desired chemical quality, and then the melting furnace 2 of the present invention can be operated more quickly in its function as a primary melting facility. If desired the melting furnace 2 can be used to produce final quality steel but then the production rate will be slower than if the melting furnace 2 is just used to produce semi-finished steel.

The steel can be produced as billets, blooms, slabs or rounds for rolling mills, to produce steel of the required section.

Figure 6:
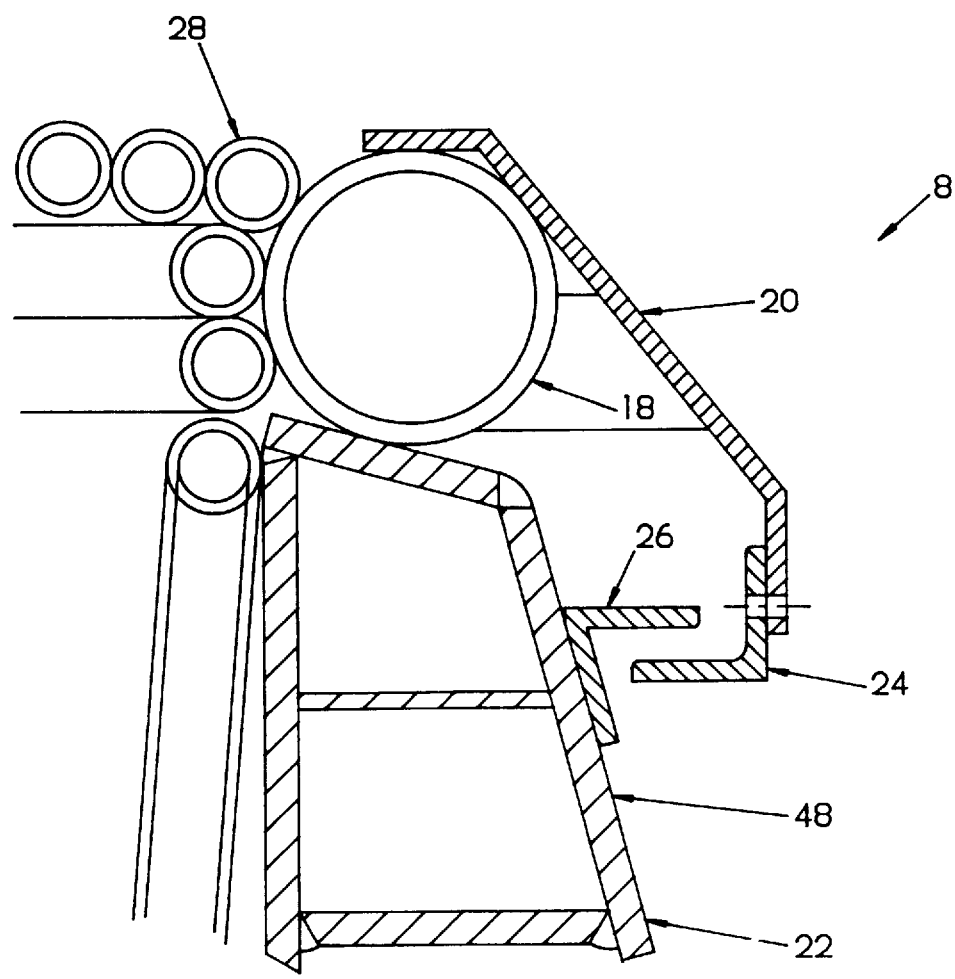
FIG. 6 shows an alternative sealing construction to that shown in FIG. 5.

Referring now to FIG. 6, similar acting parts as in FIG. 5 have been given the same reference numerals for ease of comparison and understanding. In FIG. 6, the flat roof seal ring 26 of FIG. 5 has been replaced by a tapered bore angle roof seal ring 26 which registers with a tapered surface 48 of the ring 22. The roof seal ring 26 shown in FIG. 6 is free to be lifted by the furnace roof 6.

It is to be appreciated that the embodiment of the invention described above with reference to the accompanying drawings has been given by way of example only and that modifications may be effected. Thus, for example, the trommel 34 can be replaced by another type of pre-heating means 14 such for example as a heated conveyer. The rockers 30 may be replaced by pivot means. The burner means 12 may be an electric arc burner means instead of an oxy:fuel burner means, in which case the pre-heating means 14 would be an oxy:fuel pre-heating means. The illustrated refractory lined fume take-off elbow 44 may be replaced by a tubular water-cooled fume take-off elbow. The tubular watercooled fume take-off elbow will normally be lighter than the refractory lined fume take-off elbow 44 and it may be more resistant to damage from scrap during scrap charging of the trommel 34.

We claim:

1. An oxy:fuel melting furnace comprising a rotatable furnace body, a normally stationary non-rotatable furnace roof for fitting on the furnace body, dynamic sealing means for dynamically sealing the furnace roof on the furnace body such that the furnace body can rotate with respect to the furnace roof, tiltable support means for supporting the furnace body such that tilting of the support means causes tilting of the furnace body for tapping and slagging, moving means for moving the furnace roof such that the furnace roof is able to be lowered onto the furnace body when the furnace body is to be titled for the tapping and slagging, and such that the furnace roof is able to be raised from the furnace body in order to allow the rotation of the furnace body relative to the furnace roof during melting of material introduced into the furnace body, heating means which is mounted on the furnace roof and which is for providing heat for the melting, and pre-heating means for pre-heating the material prior to its introduction into the furnace body, and the oxy:fuel melting furnace being such that at least one of the heating means and the pre-heating means burns oxy:fuel.

2. An oxy:fuel melting furnace according to claim 1 in which the furnace body is a shallow furnace body.

3. An oxy:fuel melting furnace according to claim 2 in which the furnace body rotates on wheels.

4. An oxy:fuel melting furnace according to claim 2 in which the furnace body is lined with refractory material.

5. An oxy:fuel melting furnace according to claim 1 in which the furnace body includes water cooled means.

6. An oxy:fuel melting furnace according to claim 1 in which the dynamic sealing means comprises a piston ring acting on an inclined surface on the furnace body.

7. An oxy:fuel melting furnace according to claim 6 in which the dynamic sealing means is such that a top ring seals the furnace roof to the furnace body when the furnace roof is lowed onto the furnace body and the furnace body is tilted for tapping and slagging.

8. An oxy:fuel melting furnace according to claim 1 in which the tiltable support means comprises a tiltable platform means.

9. An oxy:fuel melting furnace according to claim 1 in which the pre-heating means comprises a trommel, and in which the trommel is pre-heated by exhaust gases from the furnace body.

10. An oxy:fuel melting furnace according to claim 1 and including adding means for adding chemical additions to the furnace body for increasing the temperature in the furnace body, the adding means being mounted on the furnace roof.

* * * * *